United States Patent [19]

Grunfeld

[11] Patent Number: 4,646,678
[45] Date of Patent: Mar. 3, 1987

[54] THIN FILM DEPOSITION

[75] Inventor: Frank A. Grunfeld, Kenilworth, England

[73] Assignee: Nima Technology Limited, Coventry, England

[21] Appl. No.: 754,412

[22] Filed: Jul. 12, 1985

[30] Foreign Application Priority Data

Jul. 14, 1984 [GB] United Kingdom ............... 8417959

[51] Int. Cl.⁴ ............................................. B05C 3/09
[52] U.S. Cl. .................................. 118/667; 118/692; 118/402
[58] Field of Search ............... 118/402, 403, 667, 712, 118/692; 427/434, 3

[56] References Cited

U.S. PATENT DOCUMENTS

| | | | |
|---|---|---|---|
| 2,615,821 | 10/1952 | Levy | 118/403 X |
| 3,678,891 | 7/1972 | Rosenberg | 118/402 |
| 4,093,757 | 6/1978 | Barraud et al. | 118/402 X |
| 4,511,604 | 4/1985 | Barraud et al. | 118/402 X |

Primary Examiner—John P. McIntosh
Attorney, Agent, or Firm—Charles E. Brown; Charles A. Brown

[57] ABSTRACT

An apparatus for depositing a mono or multimolecular layer film on a substrate has a trough (1) in which the liquid sub-phase (W) is received, the sub-phase carrying a monomolecular layer film of e.g. a diacetylenic fatty acid. The apparatus has a barrier system (4) consisting of a boom (40) which is pivotted on the center of a rigid spoked ring (42) and pivotable towards and away from the adjacent spoke to compress the molecular layer the desired amount. The vertical position of the ring is adjustable by bolts (24) to position the upper surface of the adjacent spoke (41) and lower surface of the boom (40) below but not through the liquid surface. This enables the monomolecular layer to be compressed without leakage of molecules and also allows contaminants to be collected by sweeping the boom across the surface before the layer is added.

12 Claims, 7 Drawing Figures

THIN FILM DEPOSITION

The present invention relates to the deposition of mono and multilayer molecular films on substrates.

It is known to effect the lateral compression of a molecular layer on the surface of a liquid sub-phase, for the subsequent molecular layer film deposition on a substrate e.g. in accordance with the Langmuir-Blodgett technique.

The technique is known as the barrier system where a molecular layer e.g. of a diacetylenic fatty acid (diacetylene) is subject to suitable controlled compression on the surface of a liquid such as pure water by barrier means. A substrate such as a slide is then dipped through the molecular layer into the liquid one or more times according to the mono or multimolecular layer deposition required on the substrate. The first layer is deposited on the first down pass or up pass of the substrate, regard being had to the hydrophobic or hydrophilic nature of the surface of the substrate and of the initial molecular layer on the surface of the liquid, and a further layer deposited each time the substrate crosses the air/water interface.

Substrates having molecular films deposited on them by the above-mentioned technique are used for a variety of purposes such as in ultra violet or electron beam lithography, molecular filtration and gas sensors to name a few typical examples in a widening field of application.

The present invention seeks to provide an improved molecular layer deposition apparatus having an effective and readily controlled action and of compact form.

Accordingly, the present invention provides apparatus for depositing a mono or multimolecular layer film on a substrate comprising, a receptacle for receiving a liquid sub-phase for carrying a monomolecular layer film on the surface thereof barrier means for enclosing a portion of the surface area of said liquid sub-phase, said barrier means having a first barrier member angularly movable in a substantially horizontal plane towards and away from a second barrier member for adjusting the area of said portion to enable lateral compression of said film on said sub-phase surface; and means for dipping said substrate through said monomolecular layer film on said liquid sub-phase surface whereby to deposit a molecular layer of said film on said substrate.

The present invention is further described hereinafter, by way of example, with reference to the accompanying drawings, in which.

Figure 1:
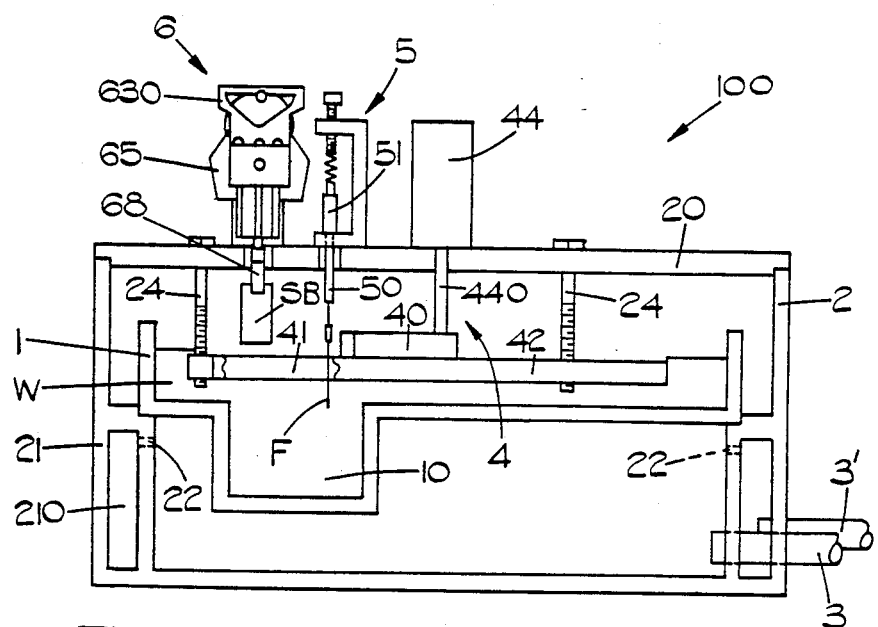
FIG. 1 is a diagrammatic vertical cross section through a molecular layer deposition apparatus according to the present invention.

Referring to FIG. 1 the molecular layer deposition apparatus 100 generally comprises a receptacle or trough 1 e.g. of boro-silicato glass having a well at 10 for substrate dipping purposes and is mounted in an outer housing 2 through which liquid such as water is circulated by way of inlet and outlet pipes 3, 3' to maintain the trough 1 and a liquid sub phase W in the latter at a required operating temperature. The housing 2 is double walled at 21 so as to act as a heat insulating jacket and may be of plastics material such as "Perspex" (Registered Trade Mark) and is preferably suitably coloured e.g. orange, so as to serve as a filter against ultra violet light. The cavity 210 of the double wall 21 may serve as a circulating water return path in which case the inlet pipe 3 opens into the housing 2 while the outlet pipe 3' leads from the cavity 210. The water from the housing 2 flows into the cavity 210 via openings 22 in the upper part of the cavity inner wall.

Suspended within the trough 1 from a cover 20 of the housing 2 is the barrier system 4, such suspension being effected by screws 24 for enabling the assembly to be levelled and its vertical position adjusted in relation to the surface of the liquid sub phase W in the trough 1. The screws 24 are shown threaded in bores 424 in a ring 42 of the barrier assembly 4.

Figure 2:
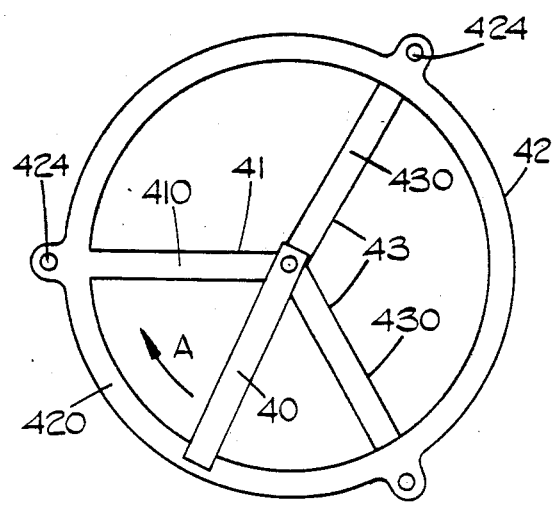
FIG. 2 is a plan view of a barrier means of the apparatus of FIG. 1.

The barrier system 4 is preferably made df or faced with a hydrophobic material such as PTFE (polytetrafluoroethylene) to prevent or minimise contamination of the liquid sub phase W and a molecular layer thereon and also for smooth antifriction relative movement of its co-operating members. The barrier system (FIG. 2) comprises an angularly movable barrier member in the form of a radial arm 40 and a fixed radial barrier member 41, the latter serving as a spoke to the ring which is connected by further spokes 43 to the centre of the assembly 4 to provide a rigid structure. The barrier member 40 is conveniently pivoted at the centre for horizontal movement.

The arrangement is preferably such that the boom 40 is angularly movable with the underface 400 (FIG. 3) of its free end in substantially rubbing contact with the upper face 420 of the ring 42 and with the upper face 410 of the fixed barrier member 41. For this purpose the upper face 410 of the barrier member is flush with the upper surface 420 of the annulus 42 whereas the other spokes 43 are shown having their upper surfaces 430 at a lower level.

The boom 40 is driven by an electric motor 44 (e.g. a D.C. or stepping motor) mounted on the cover 20, the barrier member 40 preferably being directly carried by the motor shaft 440 passing vertically through the cover 20.

Figure 3:
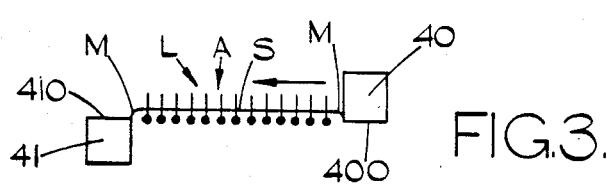
FIG. 3 is a detail diagram showing the action of the barrier means.

In use the barrier assembly 4 is adjusted by the suspension screws 24 so that the upper surfaces 410, 420 of the spoke 41 and annulus 42 are fractionally below that S of the liquid such as water W (aqueous sub-phase) in the trough 1 so that the meniscus M of the surface S of the water W in relation to the spoke 41 (and annulus 42) and the boom 40 is as shown in FIG. 3.

For lateral pressure application to a molecular layer L on the surface S of the water W, the boom 40 is driven by the motor 44 for angular movement towards the spoke 41 in a controlled manner referred to below.

However, initially the boom 40 is moved in a reverse direction from beyond the spoke 41 back over the latter to a start position in order to sweep the surface area A of the water W between the spoke 41 and boom 40 clear of contaminants which are retained behind the boom 40. A predetermined quantity of solvent containing molecules of the required substance e.g. a diacetylenic fatty acid is then introduced onto the surface area A so as to leave a monomolecular layer L of the molecules on the surface area A after evaporation of the solvent. Angular movement of the boom 40 towards the spoke 41 then applies lateral pressure to the layer L of molecules so that they assume an orderly side by side arrangement diagrammatically indicated in FIG. 3.

In the case of long chain organic amphiphillic molecules such as of a fatty acid, they contain both hydrophobic and hydrophilic constituents so that they orientate themselves with the hydrophilic heads in the water W while their hydrophobic tails are free to rotate about their carbon-carbon bonds in the atmosphere above the water surface S. Thus the molecules extend through the interface provided by said surface S between the aqueous sub phase W and the atmospheric super phase or air. The compression and containment of the molecules between the boom 40 and spoke 41 and also by the corresponding segment of the annulus 42 is such that the homogeneous insoluble molecular monolayer L is formed as indicated in FIG. 3.

Particularly when the boom 40 is close to the spoke 41 considerable relative variation in the extent of the surface area A can be obtained on a small extent of angular movement of the boom 40 whilst "dead" surface area is kept to a minimum compared with known linear acting barrier systems.

The operation of the barrier assembly 4 and also of the complete film deposition apparatus is preferably computer controlled such as by a suitably programmed dedicated computer 45 for controlling the motor 44 and substrate dipping mechanism 6 (referred to below) and is also responsive to pressure and temperature feed back from the apparatus in monitoring required operation.

Figure 4:
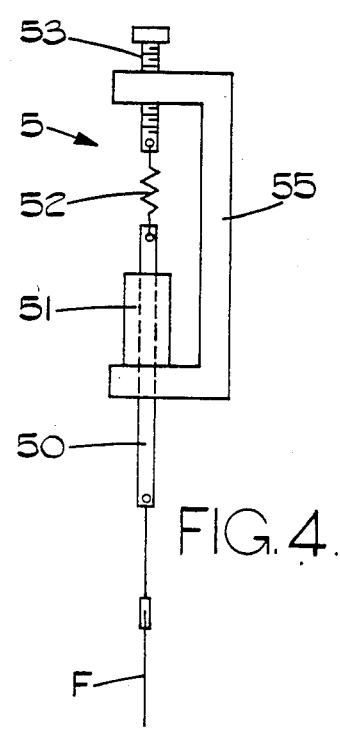
FIG. 4 is a side elevation of a pressure sensor.

Feedback of the lateral pressure applied to a molecular layer L on the surface area A of the water W is effected by a sensing unit 5 (FIG. 4). A sensing element consisting of a piece or strip of filter paper F depends from the sensing unit 5 and is partially inserted through the surface S of the water in the area A. The surface tension of the water W exerts a downward pull on the filter paper F to move axially or preset an armature 50 (to which the paper F is attached) relative to a vertical displacement device such as a linear voltage differential transducer 51 or a microbalance head which transmits a corresponding signal representative of the pull to the computer. The armature 51 is spring loaded against such movement by a tension spring 52 anchored to an adjusting screw 53 carried by a bracket 55 of the unit 5. The presence of a molecular layer L on the surface S of the water W and the lateral pressure to which said layer L is subjected has the effect of reducing the surface tension resulting in upward movement of the filter paper F by the spring 52. A resulting signal from the transducer 51 is fed back to the computer for indication of the prevailing lateral pressure on the molecular layer L whereupon the motor 44 is operated accordingly to move the barrier 40 until the required compression of the molecules is obtained.

By feedback from temperature responsive means 46 to the trough 1 the computer also controls the temperature of the water W in the trough 1 by appropriate control of the temperature and/or rate of flow of the water or other liquid circulated through the housing 2 by a heat pump 47.

The computer can also be used to monitor and control various other factors such as the PH acidity of the water W in the trough 1 using a PH sensor 48 and the position of the boom 40. The angular position of the boom 40 can be sensed by a position sensor 49.

Figure 5:
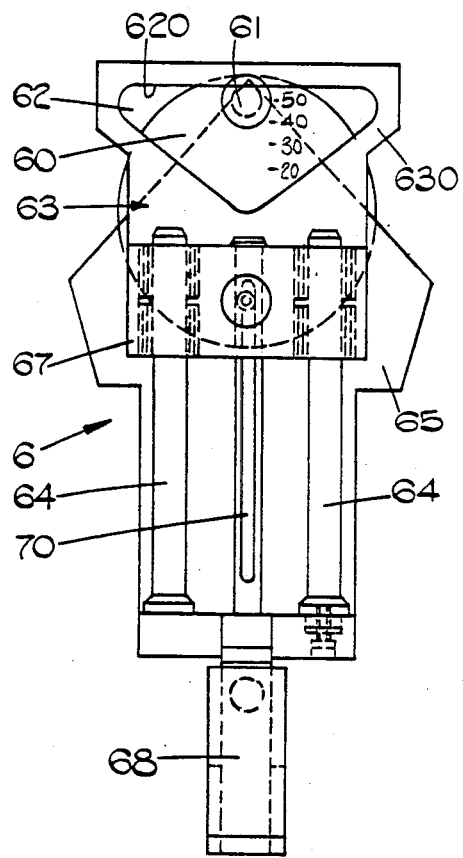
FIGS. 5 and 6 are front and side elevations showing a substrate dipping mechanism.
Figure 6:
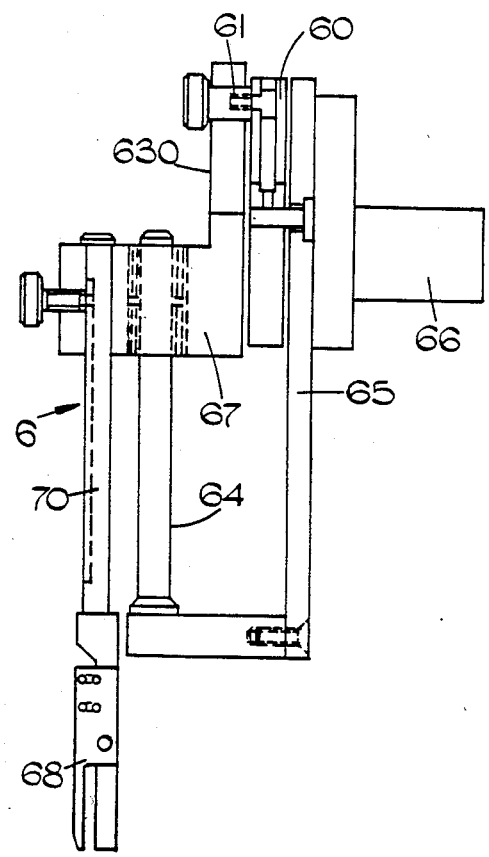
Figure 7:
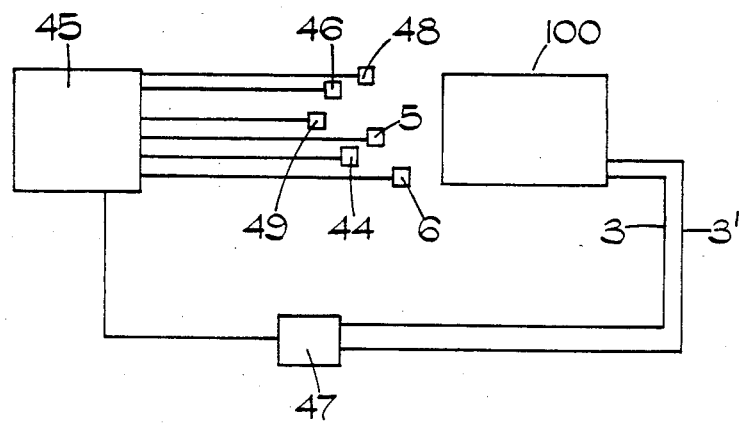
FIG. 7 is a schematic diagram of the control system of the apparatus.

Once the molecules have been compressed as required and all other monitored factors are satisfactory operation of the substrate dipping mechanism 6 (FIGS. 5 and 6) is effected. The dipping mechanism 6 has a pin 61 carried by a motor driven rotary member such as a disc 60, the pin engaging a co-operating surface 620 in the upper part or head 630 of a slide 63 vertically slidable on parallel guide bars 64 on an upstanding support 65. The upper part of the support 65 carries an electric motor 66 such as a D.C. or stepping motor for geared drive of the disc 60. The co-operating surface 620 in the slide head 630 for the pin 61 is shown provided by the upper horizontal edge of a V-shaped slot 62. The lower portion of the slot 62 enables a scale to be read on the disc 60. It will be appreciated that any suitable shaped slot such as a T-shaped slot may be provided in the head 630 for this purpose and to provide the co-operating surface 620. The slide 63 has a horizontally projecting foot 67 which carries a vertically depending dipper bar 70. The latter at its lower end receives a clip 68 or other suitable attachment means for holding a substrate SB for dipping through the molecular layer L into the water W in the trough 1. The well 10 affords sufficient depth for maximum downward movement of the substrate and enables the capacity of the trough 1 to be kept to a minimum for minimal use of distilled water W and to facilitate temperature control thereof.

The position of the pin 61 on the disc 60 may be radially adjustable such as along a radial slot or by alternate hole location in order to enable stepped or continuous variation of the stroke of the slide 63 and extent of vertical movement of the substrate SB conveniently between 0 and 5 cm.

In the above described example the pin and slot action of the dipping mechanism 5 imparts downward and upward movement to the substrate SB with a sinusoidal velocity vector for smooth transition from one movement to the other but it will be appreciated that any suitable motor drive mechanism may be employed for imparting vertical oscillation to the substrate SB such as a crank or eccentric mechanisms or reversible screw or rack and pinion mechanisms.

As already mentioned the number of oscillations imparted to the substrate SB depends on the number of molecular layers it is desired to deposit or "stack" on the substrate.

It will also be appreciated that the use of computer control allows the various control factors such as monolayer surface pressure, surface area, sub-phase temperature and acidity to be preset to enable automatically controlled deposition at preset deposition speeds to be effected.

I claim:

1. Apparatus for depositing a mono or multimolecular layer film on a substrate, said apparatus comprising a receptacle for receiving a liquid sub-phase for carrying a molecular layer film on the surface thereof, barrier means for enclosing a portion of the surface area of said liquid sub-phase, said barrier means including a fixed barrier member, a movable barrier member angularly movable in a substantially horizontal plane disposed above said fixed barrier member towards and away from said fixed barrier member for adjusting the effective area of said enclosed surface portion to enable lateral compression of said molecular layer film on said sub-phase surface, and means for dipping said substrate through said molecular layer film on said liquid sub-phase surface whereby to deposit a molecular layer of said film of said substrate.

2. Apparatus as claimed in claim 1 wherein said barrier means is adapted to enable said movable barrier member to be swept across said surface portion whereof to remove contaminants from said surface portion prior to addition of said molecular layer film.

3. Apparatus as claimed in claim 2 wherein said movable barrier member has a lower edge and said fixed first barrier member has an upper edge, and said lower edge of said movable barrier member is in substantially the same horizontal plane as said upper edge of said fixed barrier member, and said barrier means has means for adjusting the vertical position of said barrier means for lowering said edges below but not through the surface of the liquid sub-phase.

4. Apparatus as claimed in claim 1 wherein said dipping means (6) has support means for supporting said substrate and is operable to reciprocate said support means in a generally vertical path for driving said substrate through said film a preselected number of times.

5. Apparatus as claimed in claim 4 wherein said dipping means has means for sinusoidally varying the speed of said support means for providing a smooth transition in the reversal of direction of movement of the substrate.

6. Apparatus as claimed in claim 4 wherein the stroke of said dipping means is adjustable in the range 0–5 cm.

7. Apparatus as claimed in claim 1 further comprising a housing for supporting said receptacle, means for circulating fluid between said housing and said receptacle for controlling the temperature of said liquid sub-phase, and means for monitoring the temperature of said sub-phase and controlling the temperature of said fluid in dependence thereon whereby to maintain the temperature of said liquid sub-phase at a preselected value.

8. Apparatus as claimed in claim 1 further comprising means for monitoring the surface pressure of said molecular layer film on said liquid sub-phase and adjusting the angular position of said movable barrier member in dependence of said monitored surface pressure to adjust said surface pressure to a preselected value.

9. Apparatus as claimed in claim 8 wherein said monitoring means comprises means for partially projecting through the surface of the liquid sub-phase and means for measuring the force applied to said projecting means by said liquid sub-phase.

10. Apparatus as claimed in claim 1 wherein said movable barrier member has a pivot joint disposed along said fixed barrier member for movement of said movable barrier member between a position parallel to said fixed barrier member and a position disposed in angular relation to said fixed barrier member.

11. Apparatus as claimed in claim 1 wherein said fixed barrier member and said movable barrier member are rigid members.

12. Apparatus for depositing a mono or multimolecular layer film on a substrate, said apparatus comprising a housing, a receptacle supported by said housing for receiving a liquid sub-phase for carrying a molecular layer film on the surface thereof, said housing and said receptacle defining a space therebetween for containing fluid, barrier means for enclosing a portion of the surface area of said liquid sub-phase, said barrier means including a fixed barrier member, a movable barrier member angularly movable in a substantially horizontal plane towards and away from said fixed barrier member for adjusting the area of said surface area portion to enable lateral compression of said film on said sub-phase surface, said moveable barrier member having a lower edge and said fixed barrier member having an upper edge, and wherein said lower edge of said moveable barrier member is in substantially the same horizontal plane as said upper edge of said fixed barrier member, means for supporting said barrier means in said receptacle for enabling adjustment of the vertical position of said barrier means for lowering said edges below but not through the surface of said liquid sub-phase, and means for dipping said substrate through said molecular layer film on said liquid sub-phase surface whereby to deposit a molecular layer of said film on said substrate.

* * * * *